(12) United States Patent
Connell et al.

(10) Patent No.: US 7,888,418 B2
(45) Date of Patent: Feb. 15, 2011

(54) BLOCK COPOLYMER MODIFIED VEGETABLE OIL AND POLYMER BLENDS AND METHODS OF MAKING SAME

(75) Inventors: Eric John Connell, Ann Arbor, MI (US); Marc Andrew Hillmyer, Minneapolis, MN (US); Kwanho Chang, Roseville, MN (US)

(73) Assignees: Toyota Motor Engineering & Manufacturing North America, Inc., Erlanger, KY (US); University of Minnesota, St. Paul, MN (US)

( * ) Notice: Subject to any disclaimer, the term of this patent is extended or adjusted under 35 U.S.C. 154(b) by 655 days.

(21) Appl. No.: 11/957,559

(22) Filed: Dec. 17, 2007

(65) Prior Publication Data

US 2009/0156746 A1 Jun. 18, 2009

(51) Int. Cl.
C08K 5/09 (2006.01)
C08K 5/10 (2006.01)
C08L 67/08 (2006.01)
C08F 299/04 (2006.01)
C08G 63/08 (2006.01)
C08G 63/06 (2006.01)
C08G 63/02 (2006.01)

(52) U.S. Cl. ........................ 524/322; 524/300; 523/500; 523/522; 525/437; 525/450; 528/272; 528/354

(58) Field of Classification Search .............. 524/300, 524/322; 528/272, 354; 525/437, 450; 535/500, 535/522

See application file for complete search history.

(56) References Cited

U.S. PATENT DOCUMENTS

| | | | |
|---|---|---|---|
| 4,369,284 A | 1/1983 | Chen | |
| 5,166,376 A | 11/1992 | Suzuki et al. | |
| 5,206,087 A | 4/1993 | Tokiwa et al. | |
| 5,359,026 A | 10/1994 | Gruber | |
| 5,407,715 A | 4/1995 | Buddenhagen et al. | |
| 5,756,651 A | 5/1998 | Chen et al. | |
| 5,795,969 A | 8/1998 | Fehr et al. | |
| 5,858,934 A | 1/1999 | Wiggins et al. | |
| 5,869,164 A | 2/1999 | Nickerson et al. | |
| 5,908,918 A | 6/1999 | Chen et al. | |
| 5,916,950 A | 6/1999 | Obuchi et al. | |
| 5,922,832 A | 7/1999 | Randall et al. | |
| 5,981,781 A | 11/1999 | Knowlton | |
| 5,998,552 A | 12/1999 | Gruber et al. | |
| 6,103,834 A | 8/2000 | Espinoza | |
| 6,291,597 B1 | 9/2001 | Gruber et al. | |
| 6,355,693 B1 | 3/2002 | Herslof et al. | |
| 6,495,631 B1 * | 12/2002 | Randall et al. | ............... 525/186 |
| 6,869,985 B2 | 3/2005 | Mohanty et al. | |

(Continued)

OTHER PUBLICATIONS

Cavicchi, K. A.; Berthiaume, K. J.; Russell, T. P. Polymer, 2005, 46, 11635-11639. 2005 Elsevier Ltd.*

(Continued)

*Primary Examiner*—Mark Eashoo
*Assistant Examiner*—Michael Pepitone
(74) *Attorney, Agent, or Firm*—Dinsmore & Shohl LLP

(57) ABSTRACT

Embodiments of a polymer and vegetable oil based composition comprise a polylactide homopolymer, a vegetable oil dispersed inside the polylactide homopolymer, and a block copolymer configured to aid the dispersion of the vegetable oil inside the polylactide homopolymer.

18 Claims, 1 Drawing Sheet

U.S. PATENT DOCUMENTS

| | | | |
|---|---|---|---|
| 7,196,124 | B2 | 3/2007 | Parker et al. |
| 7,256,223 | B2 | 8/2007 | Mohanty et al. |
| 7,354,656 | B2 | 4/2008 | Mohanty et al. |
| 2003/0088003 | A1 | 5/2003 | Corzani et al. |
| 2004/0034128 | A1 | 2/2004 | Tokiwa et al. |
| 2006/0041157 | A1 | 2/2006 | Petrovic et al. |
| 2006/0121170 | A1 | 6/2006 | Howard |
| 2006/0258544 | A1 | 11/2006 | Saini |
| 2007/0015929 | A1 | 1/2007 | Casper |
| 2007/0077298 | A1 | 4/2007 | Liu et al. |
| 2008/0281018 | A1 | 11/2008 | Seeliger et al. |

OTHER PUBLICATIONS

Schmidt, S. C.; Hillmyer, M. A. Macromolecules, 1999, 32, 4794-4801. 1999 American Chemical Society.*

International Search Report and Written Opinion pertaining to International application No. PCT/US2008/086320 dated Feb. 4, 2009.

Kelly S. Anderson et al., "The influence of block copolymer microstucture on the toughness of compatibilized polylactide/polyethylene blends", ScienceDirect, Nov. 17, 2004.

Yongjin Li et al., "Toughening of Polylactide by Melt Blending with a Biodegradable Poly(ether) urethane Elastomer", Wiley InterScience Journals, Apr. 16, 2007.

Esther Frick and Marc Hillmyer, "Synthesis and characterization of polylactide-block-polyisoprene-block-polylactide triblock copolymers: new thermoplastic elastomers containing biodegradeable segments", Macromol. Rapid Commun., p. 1317-1322, Dec. 2000.

Esther Frick, Andrew Zalusky and Marc Hillmyer, "Characterization of Polylactide-b-polyisoprene-b-polylactide Thermoplastic Elastomers", bIOMACROMOLECULES, p. 216-223, Feb. 11, 2003.

* cited by examiner

BLOCK COPOLYMER MODIFIED VEGETABLE OIL AND POLYMER BLENDS AND METHODS OF MAKING SAME

TECHNICAL FIELD

The present invention is generally related to biodegradable blends of low molecular weight oils and high molecular weight polymers, and is specifically related to vegetable oils dispersed in a matrix of the aliphatic polyesters, wherein the dispersion is aided by a block copolymer.

BACKGROUND

In recent years, an increasing desire for alternatives to replace traditional non-degradable petroleum-based plastics has motivated deriving polymeric materials from annually renewable natural resources. Of great interest and environmental importance are aliphatic polyesters, such as polylactide materials, which are attractive polymer materials, because of their stiffness and tensile strength. Aliphatic polyesters may be used for disposable or durable molded resin applications.

Conventional methods have blended the polylactides with petroleum non-renewable materials or rubbery materials to toughen polylactides; however, control of the morphology and dispersion has been difficult. To achieve a desirable two-phase morphology while retaining the biorenewability and degradability of the polylactide composite, the present inventors blended vegetable oil with the polylactide. Despite the benefits of the blend, polylactide and vegetable oil are highly immiscible with one another and are difficult to mix, in part due to a large viscosity difference between the two components. Accordingly, improved blends of polylactide and vegetable oil as well as improved methods of blending and controlling the blends are desirable.

SUMMARY

According to one embodiment, a polymer and vegetable oil based composition, for example, an emulsion (or a stabilized dispersion of one phase in another) is provided. The composition comprises a polylactide homopolymer, a vegetable oil dispersed inside the polylactide homopolymer, and a block copolymer configured to aid the dispersion of the vegetable oil inside the polylactide homopolymer.

In a further embodiment, another polymer and vegetable oil based composition is provided but with polylactide and vegetable oil phases inverted. This inverted phase composition comprises a vegetable oil, a polylactide homopolymer, and a polyisoprene-polylactide block copolymer containing less than about 70% by volume polylactide.

According to yet another embodiment, a method of achieving inverted phases in a polymer and vegetable oil based emulsion is provided. The method comprises the steps of providing a polylactide homopolymer composition, a vegetable oil composition, and a block copolymer in a mixing vessel, and mixing these components to produce a first emulsion comprising vegetable oil dispersed within the polylactide homopolymer. The method further comprises reducing the volume fraction of the polylactide in the block copolymer to below about 70% in a separate blend. Unlike the first emulsion, the second emulsion comprises polylactide homopolymer dispersed within the vegetable oil.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawing enclosed herewith.

Figure 1:
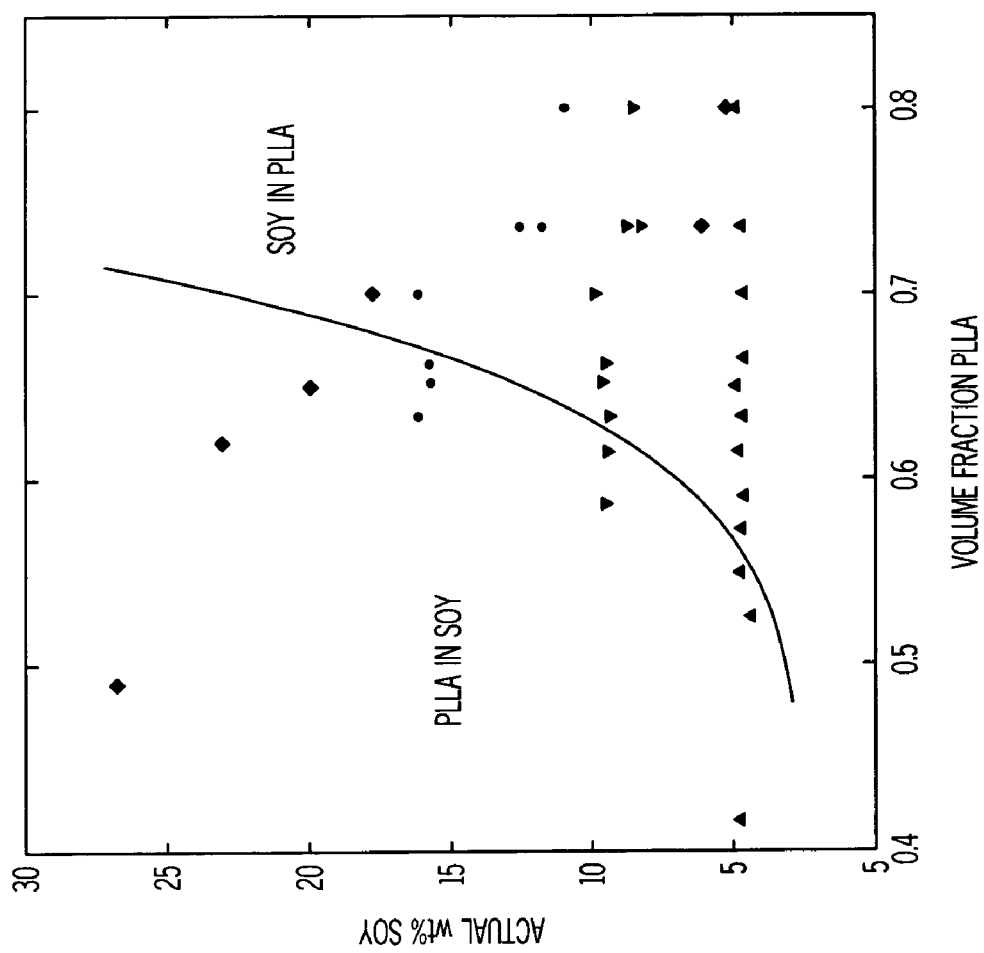
FIG. 1 is a graphical illustration showing the effect of the volume fraction of the polylactide in the polyisoprene-polylactide block copolymer on the blends of the present invention according to one or more embodiments of the present invention.

The embodiments set forth in the drawing are illustrative in nature and not intended to be limiting of the invention defined by the claims. Moreover, individual features of the drawing and invention will be more fully apparent and understood in view of the detailed description.

DETAILED DESCRIPTION

Embodiments of the present invention are directed to a polymer and vegetable oil based composition. As used herein, the "composition" may include and may be described by various structural names, e.g. micelles, emulsions, colloids, lamellar structures, blends, or combinations thereof. The composition comprises a polylactide homopolymer and a vegetable oil dispersed inside the polylactide homopolymer. To address the aforementioned immiscibility between the polymer (e.g. polylactide) and the vegetable oil, the inventors utilized a block copolymer configured to aid the dispersion of the vegetable oil inside the polylactide homopolymer. In operation, the vegetable oil may be dispersed as droplets within a matrix defined by the polylactide homopolymer. Further embodiments of the present invention are directed to an inverted polymer and vegetable oil based composition The polylactide homopolymer may comprise many polymers suitable for use in a biorenewable blend, (e.g. poly(L-lactide) (PLLA), its stereoisomers, or combinations thereof). The PLLA may be produced through various methods familiar to one of ordinary skill in the art, for example, ring opening polymerization of L-lactide.

The vegetable oil may also comprise numerous suitable components. As used herein, a vegetable oil is a mixture of triglycerides with a varying degree of unsaturated fatty acids. In one embodiment, the vegetable oil comprises soybean oil (SOY), because soybean oil provides many advantages, for example, abundance, low cost, edibility, biodegradability, renewability, and combinations thereof. Most (e.g., about 84%) fatty acids in soybean oil are oleic, linoleic, and linolenic acids possessing 4.6 nonconjugated C=C bonds on average per molecule. This structure may yield numerous benefits if copolymerizing or modifying with other reactive organic monomers or deriving polymeric materials by functionalization or modification processes such as epoxidization, maleinization, or acrylation. In the present invention, the soybean oil may be utilized in a modified or unmodified form.

The block copolymer may comprise any polymer composition (e.g., a surfactant) suitable to address the above described immiscibility issues and aid in the dispersion of vegetable oil inside a polylactide homopolymer matrix. The block copolymer comprises various properties optimized for the present dispersion, for example, block copolymers with substantially symmetric compositions and a molecular weights of the polyisoprene blocks between about 5,900-24,000 daltons. In one embodiment, the block copolymer comprises a polyisoprene-polylactide block copolymer, such as poly(isoprene-b-lactide) (ILLA). By using high molecular weight block copolymers, mechanical properties, such as tensile strength and elongation at break, are improved, in addition to aiding the dispersion. In one exemplary embodiment, the PLLA/SOY/ILLA blend includes tensile modulus of about 450 MPa, a tensile strength of about 30 MPa, and an ultimate elongation of about 60% in the presence of about 10% SOY by weight.

Moreover, whereas blends of polylactide and vegetable oil without block copolymers are limited in regard to the amount of vegetable oil (e.g., 5% by wt. SOY) which may be incorporated into the dispersion, a block copolymer modified blend may support a larger percentage of vegetable oil in the dispersion. For example, the composition may comprise about 0.1% to about 5% by wt. of the block copolymer (e.g., ILLA), about 5% to about 20% by wt. of the vegetable oil composition (e.g., soybean oil), and about 70% to about 90% by wt. of the polylactide (e.g. PLLA).

In addition to facilitating increased dispersion of vegetable oil used inside the polylactide matrix, the block copolymer may control the phase inversion behavior of the blends, or stabilize a blend after phase inversion. For a SOY/PLLA/ILLA, the volume fraction of the PLLA or the volume fraction of the SOY must be controlled to ensure the soybean oil droplets are dispersed within the PLLA matrix. For a SOY/PLLA/ILLA blend, if the volume fraction $f_{PLLA}$ of polylactide inside the ILLA is not controlled, the soybean oil droplets may be exuded from the dispersion and become converted into a continuous phase.

In another embodiment of the present invention as shown in FIG. 1, the phases of the polymer and vegetable oil based composition may be inverted by lowering the volume fraction of polylactide in the block copolymer. This may occur, in one embodiment, when the polylactide defines a volume fraction $f_{PLLA}$ less than about 70% in the ILLA block copolymer. This phase inversion may also be controlled by altering the processing conditions involved in producing the blend. During the phase inversion, the structure of the composition may vary greatly. For example, a lamellar phase is created for a symmetric block copolymer with an $f_{PLLA}=0.66$. In contrast, asymmetric block copolymers with $f_{PLLA}=0.7$ favor disordered spherical inclusions which are dispersed as isolated objects, but can aggregate into other large domains.

The following experimental procedure and results illustrate one embodiment for producing the above described blends:

Blends were prepared using a DACA batch mixer (4.0 g) operating with tapered twin screws with which materials continuously circulate through an inner channel. The PLLA homopolymer was supplied by Toyota Motor (Mn=54000 g/mol, PDI=1.73 based on polystyrene standard) as pellets and dried in a vacuum oven overnight at 80° C. before experiment. A typical mixing speed and experimental temperature were 100 rpm and 190° C., respectively, unless otherwise stated. For binary blends, PLLA pellets were homogenized for 3 min under nitrogen purge before SOY was added dropwise using a glass pipette. In case of ternary blends, block copolymer was injected as powder with PLLA and mixed together for 5 min before the addition of SOY, which was obtained from the grocery store. In order to maximize the contact between SOY and PLLA, SOY was added dropwise using a glass pipette at different rates. The blended materials were extruded through an outlet in 20-25 min and immediately quenched in liquid nitrogen. Some binary/ternary samples were also prepared by solution blending. Total 1.0 g of mixtures were dissolved in 10 wt % chloroform and cast on Petri dishes for three days. A trace of solvent was further dried at 60±C. in a vacuum oven for a day. These blends were either annealed in glass ampules at 190±C. for 3 hours for morphology observation, or molded into disks with diameter 25 mm and gap 1.0 mm at 190±C. using a hot press for dynamic mechanical analysis.

Having described the invention in detail and by reference to specific embodiments thereof, it will be apparent that modifications and variations are possible without departing from the scope of the invention defined in the appended claims. More specifically, although some aspects of the present invention are identified herein, it is contemplated that the present invention is not necessarily limited to these aspects of the invention.

What is claimed is:

1. A polymer and vegetable oil based composition comprising:
   a polylactide homopolymer;
   a vegetable oil dispersed inside the polylactide homopolymer; and
   a block copolymer configured to aid the dispersion of the vegetable oil inside the polylactide homopolymer, wherein the block copolymer is a polyisoprene-polylactide block copolymer comprising less than about 70% by volume polylactide.

2. The composition according to claim 1 wherein the polylactide homopolymer comprises poly(L-lactide), its stereoisomers, or combinations thereof.

3. The composition according to claim 1 wherein the vegetable oil comprises soybean oil.

4. The composition according to claim 1 wherein the block copolymer comprises poly(isoprene-b-lactide).

5. The composition according to claim 1 wherein the block copolymer is a substantially symmetric surfactant.

6. The composition according to claim 1 wherein the block copolymer comprises about 0.1% to about 5% by weight of the composition.

7. The composition according to claim 1 wherein the vegetable oil comprises about 5% to about 20% by weight of the composition.

8. The composition according to claim 1 wherein the polylactide comprises about 70% to about 90% by weight of the composition.

9. The composition according to claim 1 wherein the vegetable oil is dispersed as droplets in the polylactide matrix.

10. The composition according to claim 1 wherein the polylactide homopolymer comprises poly(L-lactide), the vegetable oil comprises soybean oil, and the block copolymer comprises poly(isoprene-b-lactide).

11. A polymer and vegetable oil based composition comprising:
    a vegetable oil;
    a polylactide homopolymer, wherein at least a portion of the polylactide is dispersed inside the vegetable oil; and
    a polyisoprene-polylactide block copolymer comprising less than about 70% by volume polylactide, wherein the block copolymer is configured to stabilize the dispersion of the polylactide inside the vegetable oil.

12. The composition according to claim 11 wherein the polylactide homopolymer comprises poly(L-lactide), its stereoisomers, or combinations thereof.

13. The composition according to claim 11 wherein the vegetable oil comprises soybean oil.

14. The composition according to claim 11 wherein the block copolymer comprises poly(isoprene-b-lactide).

15. A method of inverting the phases in a polymer and vegetable oil based emulsion comprising:
    providing a polylactide homopolymer composition, a vegetable oil composition, and a block copolymer in a mixing vessel;

mixing the polylactide homopolymer, the vegetable oil, and a polyisoprene-polylactide block copolymer to produce a first emulsion comprising vegetable oil dispersed within the polylactide homopolymer; and reducing the volume fraction of the polylactide inside the polyisoprene-polylactide block copolymer below about 70% to produce a second emulsion, wherein the polylactide homopolymer is dispersed within the vegetable oil.

16. The method according to claim 15 wherein the polylactide homopolymer comprises poly(L-lactide), its stereoisomers, or combinations thereof.

17. The method according to claim 15 wherein the block copolymer is injected as a powder into the mixing vessel prior to the addition of vegetable oil.

18. The method according to claim 15 wherein the vegetable oil is added dropwise.

* * * * *